INVENTORS:
CYRIL HENDERSON
DOMINIC PAUL BARNARD

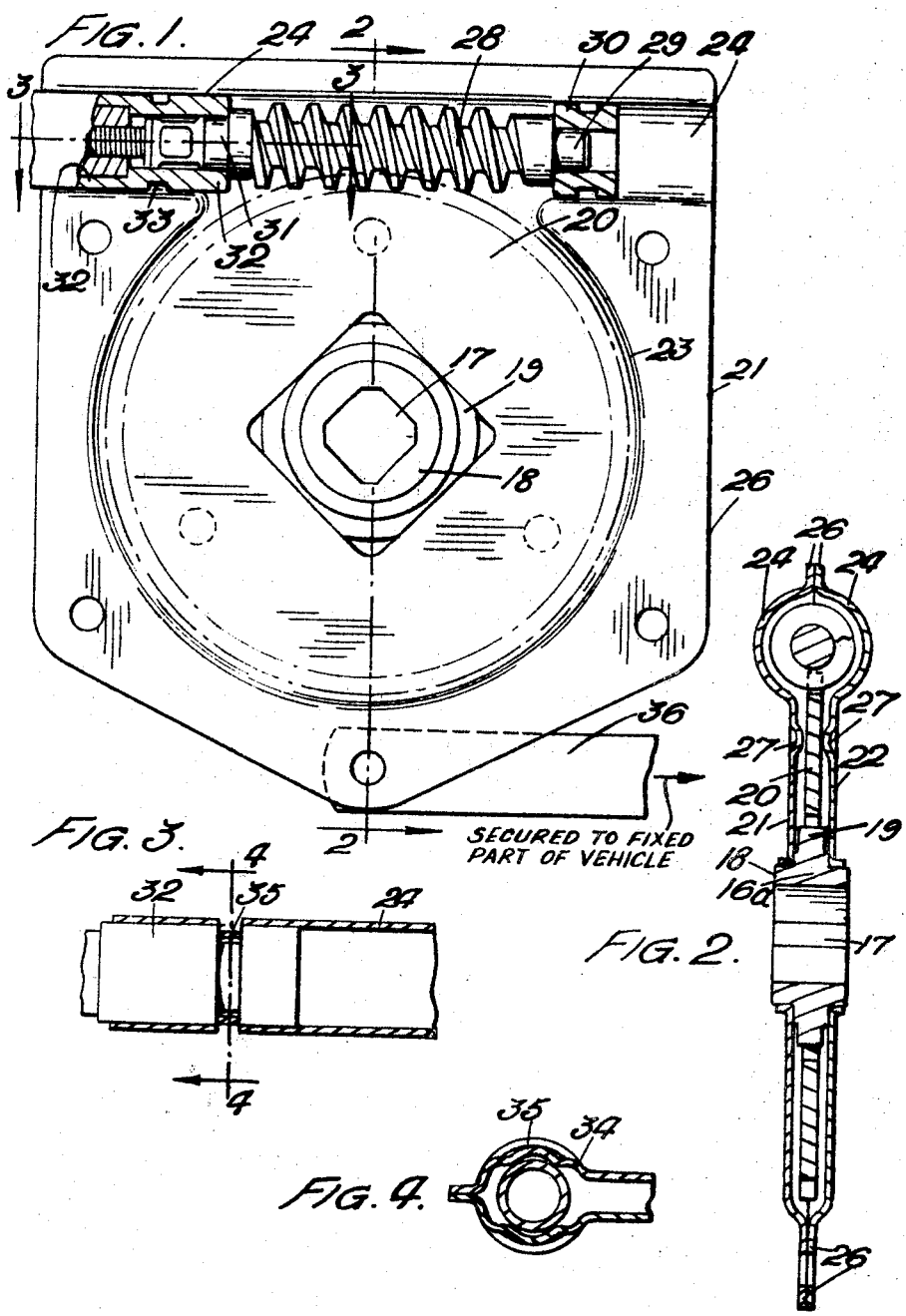

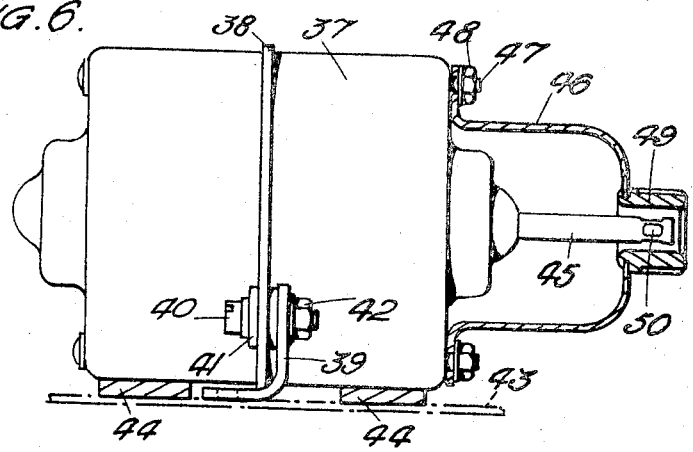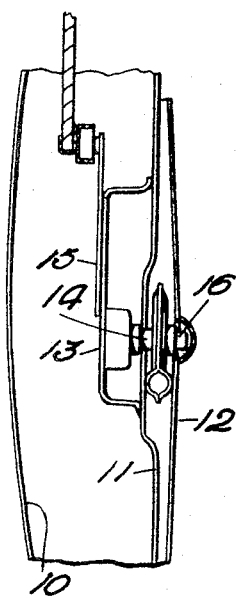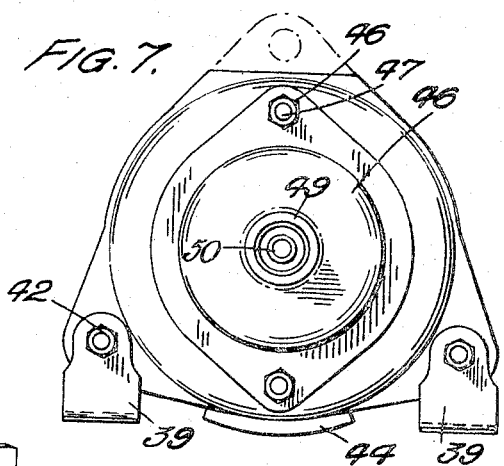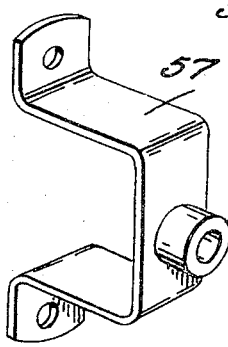

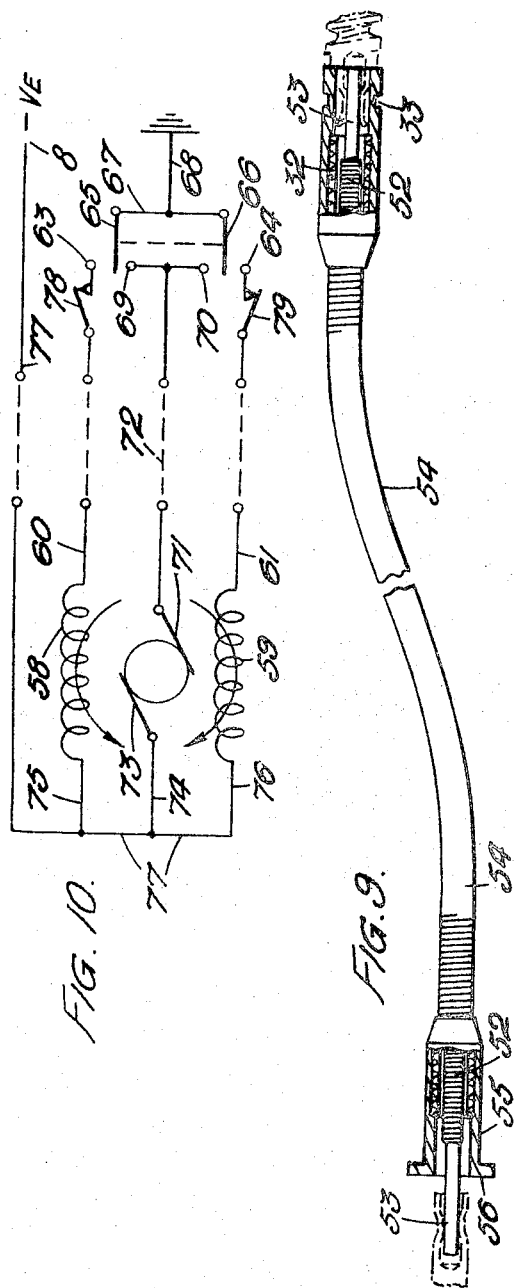

ATTORNEYS:
Hall, Pollock + Vonde Sande

United States Patent Office 3,404,485
Patented Oct. 8, 1968

3,404,485
MOTOR DRIVEN WINDING MECHANISM FOR MOTOR VEHICLE WINDOWS
Cyril Henderson and Dominic Paul Barnard, London, England, assignors to S. Smith & Sons (England) Limited, London, England, a British company
Filed July 19, 1965, Ser. No. 473,119
8 Claims. (Cl. 49—349)

ABSTRACT OF THE DISCLOSURE

The disclosure relates to a mechanism for operating the windows of motor vehicles and is particularly adapted for installation in a simple and inexpensive manner on existing automobiles, in place of the conventional hand-driven mechanism. The apparatus includes a reversible electric motor mounted to a part of the vehicle, a separate gear reduction unit supported by and adapted to rotate the operating shaft of the vehicle window-winding mechanism, a flexible drive cable between the motor and the gear units, and a means for operatively connecting the gear unit to a fixed part of the vehicle to prevent the gear unit itself from being rotated.

---

This invention relates to motor driven winding mechanism for motor vehicle windows and has for an object to provide an arrangement which is applicable to most existing doors embodying hand driven mechanisms in a simple and inexpensive manner.

The invention is directed to the kind of vehicle window winding mechanism comprising an electric motor arranged for mounting on a door structure in which the window is slidable, the driving shaft of which motor is arranged to drive a rotatable operating shaft of the window operating mechanism through a flexible cable and reduction gearing.

According to this invention a window winding mechanism of the kind referred to is characterised in that a unit embodying said reduction gearing is mounted on said operating shaft so that one element of the gearing drives said shaft and another element of the gearing is driven by the flexible cable and in that means are provided for preventing said unit rotating as a whole.

Preferably said unit is carried solely by said operating shaft.

According to another aspect of this invention a vehicle window winding mechanism of the kind referred to is characterised in that a mounting for the motor and a mounting for the gearing are separately attached to different parts of the door structure at a distance away from one another and said reduction gearing drives said operating shaft directly and in that the flexible cable is connected between said motor and gearing and is directly connected to the motor shaft.

The flexible cable may be of sufficient length to enable the motor to be mounted at different distances from the gearing and operating shaft according to the particular design and size of vehicle door with which it is to be used. Thus a standard equipment can be mass produced which will be applicable to most vehicle doors at present in use.

Preferably the cable is longer than the maximum distance likely to be encountered between the said gearing and motor, the excess length providing for a cushioning effect when the window is rapidly arrested at opposite limits of its travel.

The aforesaid reduction gearing may comprise a worm wheel arranged for attachment to said operating shaft and a worm arranged for connection with one end of said cable.

The worm wheel may be floatably mounted within a casing upon a hub portion rotatable in bearings in said casing and which hub portion is arranged for connection with said operating shaft and which casing may also be provided with bearings for supporting a work shaft and is also arranged for attachment to the door structure.

One of said bearings for the worm shaft may be formed in a ferrule at the end of a sheath surrounding the cable which ferrule is held in a socket formed in said casing.

The casing may be formed from two pressed metal sheets secured together and having inwardly extending projections for limiting lateral movement of the floating rotatable worm wheel.

The ends of the flexible cable may have secured to them square section spindle portions which are engageable with square section bores formed in an end of the motor shaft and worm shaft respectively.

A casing of the motor may have secured a cover part or bracket having a socket encircling the end of the driving shaft and for accommodating a ferrule at the end of the sheath which encircles the cable.

The motor casing also has secured thereto a bracket for attachment to a part of the door structure and flexible cushioning is arranged between the motor casing and the door structure.

In any of the arrangements referred to above the motor may be a reversible electric motor having associated therewith a hand controlled reversing switch.

Means may be provided for automatically cutting out said motor from an electric source of supply as the window reaches either its fully open or fully closed position.

The said means may comprise snap-over switch mechanism.

The snap-over switch mechanism may be operated by means driven by the rotation of the operating shaft of the window operating mechanism.

In the case where the reversible electric motor is provided with oppositely engaged coils connected through a reversing switch with the source of supply, two limit switches are provided in circuit respectively with said energising coils.

The following is a description of one embodiment of the invention reference being made to the accompanying drawings in which:

FIGURE 1 is a face view of the gearing unit with one part of the casing removed;

FIGURE 2 is a section on the line 2—2 of FIGURE 1 and showing both parts of the casing;

FIGURE 3 is a section on the line 3—3 of FIGURE 1 showing the form of connection between the casing and the ferrule of the cable sheet;

FIGURE 4 is a section on the line 4—4 of FIGURE 3;

FIGURE 5 is a diagrammatic vertical section through the part of the door which accommodates the gearing unit;

FIGURE 6 is a side elevation of the driving motor;

FIGURE 7 is a view of the motor looking from the left of FIGURE 6;

FIGURE 8 shows an alternative form of mounting for accommodating a ferrule at one end of the cable sheath;

FIGURE 9 is a view of the cable drive showing the ends in section;

FIGURE 10 is a diagrammatic wiring diagram for the motor.

Figure 12:
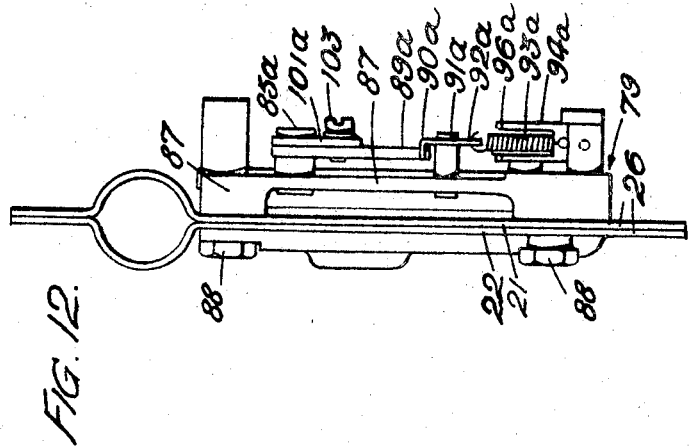

A quite common construction for a vehicle door is shown in FIGURE 5 and comprises a pressed outer sheet metal skin or panel 10 having an inwardly directed flange around its periphery and to which may be welded an inner skin 11 having a number of apertures therein, and to which may be detachably connected an ornamental door trim 12. The window raising and lowering mechanism is of a conventional type and is indicated diagrammatically at 15. The mechanism is provided with a rotatable operating shaft 14 mounted in bearings within a compartment 13 attached to the inner skin 11.

The end of the shaft within the vehicle is squared at 16 and usually fits into a socket in a handle. In applying the invention to this form of construction the handle is removed and there is attached to the shaft a part of a gearing unit illustrated in FIGURES 1 to 4. The gearing unit comprises a hub 16a formed with a socket 17 the bore in which is square in cross section so as to be engageable with the end of the operating shaft 14.

A web portion 19 having a square contour projects from the centre of the hub and the hub on either side of it forms cylindrical bosses 18. The square web portion 19 engages within a square hole in a worm wheel 20 pressed from brass sheet. Disposed on opposite sides of the web 19 and worm wheel 20 are two parts 21 and 22 on a casing. Each part is pressed from mild steel sheet so as to provide a circular recess 23 (as best seen in FIGURE 1) which intersects two half cylindrical sockets 24, also pressed out of the sheet metal. The resulting flanges 26 around the recess 23 abut one another and are secured together by semi-tubular rivets etc. The casing parts are indented at 27 to provide projections which limit the sideways movement of the worm wheel 20 but permit it to float in this direction.

Located within the cylindrical sockets 24 of the two part casing is a worm 28 in engagement with the worm wheel 20. The shaft of the worm is reduced at one end 29 and is supported in a moulded nylon bearing 30 clamped between the two parts 24 of the casing. The other end of the worm is also provided with a reduced portion 31 which is accommodated in a bearing formed in a moulded nylon ferrule 32. The ferrule is formed with a circumferential groove 33 and each casing part 34 surrounding it is slit along two lines and the material 35 between the slits is bent into the circumferential groove 33 thus holding the ferrule against axial movement therein.

In applying the unit to an existing door the square end of the operating shaft 14 is introduced into the square of the hub portion and the two part casing is prevented from rotating about the axis of the operating shaft by a torque arm 36 fixed to a part of the casing at one end and at the other fixed to a part of the door structure.

The driving motor is a reversible motor and as shown in FIGURES 6 to 8 has a casing 37 formed with a projecting flange 38 midway along its length. Two spaced angle brackets are attached to the flange by screws 40 passing through resilient bushes 41 located in holes in the flange and which screws are engaged by clamping nuts 42.

Each of the angle brackets 39 is secured to the bottom flange 43 of the door panel, the motor having been previously introduced through an aperture in the inner skin. Cushioning members of foam rubber 44 are disposed between the motor casing and the flange 43 of the door panel. The projecting end of the driving shaft 45 is encircled by a cover 46 attached by studs and nuts 47, 48 to the end of the motor casing. The shaft projects through a bushing 49 fixed in the cover. The end of the shaft is drilled and swaged inwardly at 50 to provide a square bore.

The motor shaft 45 drives the worm 28 through a flexible cable indicated at 52 in FIGURE 9 each end of which is secured to a spindle portion 53 of square cross section. The cable is encircled by a sheath 54 which at one end has secured to it the aforesaid ferrule 32 which is gripped between the two parts 24 of the casing. The square section spindle at that end engages a square section socket formed in the end 31 of the worm shaft by drilling and swaging as set out above. The other end of the sheath is also provided with a ferrule 55 having a flange 56 on the end thereof which abuts the inner face of the cover 49. In the place of the cover 49 there may be provided a U-shaped stirrup 57 as indicated in FIGURE 8 which is attached to the end of the motor casing.

As indicated earlier the motor is a reversible motor, the windings of which are indicated at 58 and 59 in FIGURE 10 which windings at one end are connected by conductors 60 and 61 to contacts 63, 64 of a reversing switch. Two spaced blades 65, 66 of the switch are connected together at 67 and to earth at 68. The two blades are movable into and out of engagement with contacts 69, 70 respectively by a suitable manipulating member and which contacts are connected to one another and to one of the commutator brushes 71, by a conductor 72. The other commutator brush 73 and the other ends of the coils 58, 59 are connected by conductors 74, 75 and 76 to a line 77 leading to the negative side of an electric supply system indicated at 8.

The manipulating member for the dual contacts 69, 70 is situated in a convenient position on the door and/or on the instrument panel.

Thus assuming the source of electric supply is an accumulator having its positive side grounded, if the carrier for the blades 65, 66 is moved in a direction to bring the blade 65 into contact with the contact 69 current will flow through the coil 58 and the motor will rotate in the direction indicated by the upper arrow and the windows will be raised whereas if the carrier for the contacts is moved in the direction to bring the blade 66 into contact with the contact 70 current will flow through the coil 59 and motor will rotate in the opposite direction lowering the window.

Figure 11:
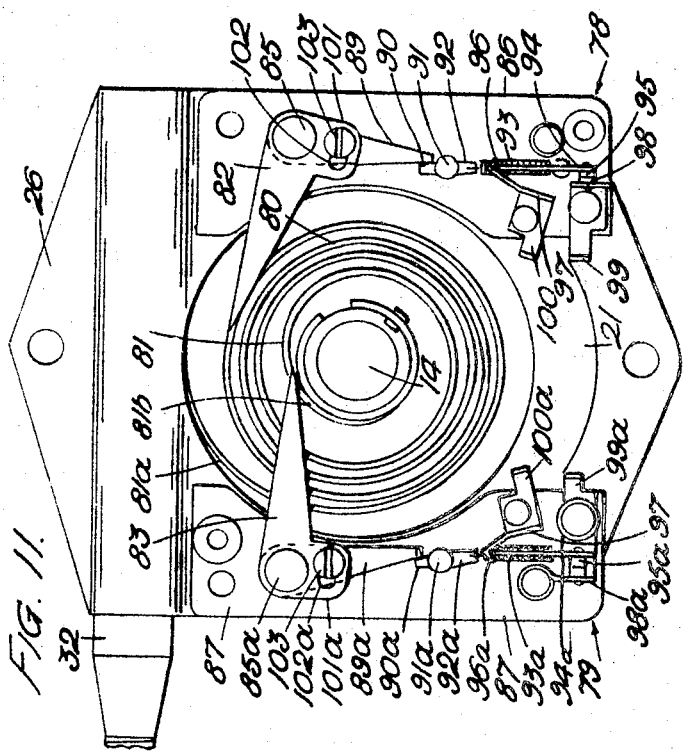
FIGURE 11 is a similar view to FIGURE 1 of a modified arrangement in which limit switches are provided for cutting out the motor at the limiting positions of the window; and, FIGURE 12 is a view looking from the left of FIGURE 11.

As will be seen from FIGURE 10 limit switches 78 and 79 are provided in the conductors 60 and 61 leading to the coils 58, 59. These switches are arranged to be automatically operated as the windows reach open and closed positions. The means for actuating the switches are shown in FIGURES 11 and 12. For this purpose the operating shaft 14 has secured to it a scroll 80 the spiral groove 81 in which is engaged by followers at the ends of arms 82, 83 of bell crank levers which operate the limit switches 78, 79. The bell crank levers are pivoted at 84, 85 on supports 86, 87 secured to the casing part 22 by screws 88. The other arm 89 of the bell crank lever is pivoted at 84 and is angularly adjustable in respect of the arm 83. For this purpose the first said arm is formed with an extension 101 which is provided with a slot 102 through which extends a clamping screw 103. The arm 89 engages one end 90 of an actuating lever pivoted at 91 intermediate of its ends on the support 86. The other end 92 of the actuating lever is secured to one end of a tension spring 93 the other end of which is connected to a blade 94 carrying a contact 95 at its lower extremity. The upper extremity of the blade is arranged to rock in a V shaped recess 96 on a fixed support 97. The arrangement is such that when the intermediate lever is rocked the line of action of the spring 93 is moved from one side to the other of the blade causing a snap over action to take place. The contact 95 is thus brought rapidly into and out of engagement with another contact 98 mounted on the blade 86 and provided with a tab 99. Similarly the support 97 is provided with a tab 100 the tabs 99, 100 are connected across the gap in the conductor 60 in FIGURE 10.

The arm 83 of the other bell crank lever has associated with it similar parts to those described above and marked with similar reference numerals with a suffix "d."
Referring to FIGURES 10 and 11 it will be assured that anti-clockwise rotation of the motor and of the scroll effects opening of the window and clockwise rotation closes the window. In the position of the parts shown in FIGURES 10 and 11 the window is in a nearly open position, and both the snap over switches 78, 79 are closed. If the operating shaft 14 is now rotated anti-clockwise by the motor the follower on the bell crank lever arm 82 will eventually reach the quick pitch portion 81a which will cause the bell crank levers 82, 89 to rotate clockwise and rapidly to open the contacts 95, 98. On the other hand the follower on the lever arm 83 will have moved anti-clockwise and the contacts 98 and 95a remain closed. Should however the operating spindle 14 have been rotated in the opposite direction the follower on the lever arm 83 would have soon reached the quick pitch portion of the scroll and the lever arm 83 would have been moved clockwise causing the snap action switch 79 to have rapidly opened when the window was in a fully open position.

The parts described above are enclosed in a separate cover part secured to the casing 21.

We claim:

1. A mechanism for driving the operating shaft of a vehicle window winding mechanism comprising,
    (a) an electric motor,
    (b) a mounting for securing the motor to a part of the vehicle,
    (c) a reduction gear unit separate from said motor and having rotatable input and output members and having said output member operatively connected to the operating shaft for rotating said shaft and supporting said gear unit,
    (d) a flexible driving cable coupled between said motor and said input member of said gear unit,
    (e) and a separate member connected between said gear unit and a part of the vehicle to prevent said gear unit from rotating with the operating shaft.

2. A mechanism according to claim 1 wherein,
    (a) rotation of said operating shaft opens and closes a window,
    (b) the electric motor is a reversible electric motor,
    (c) said mechanism further including two limit switches in circuit with the motor for automatically cutting the motor off from its source of electric supply as the window reaches two limiting positions respectively, each limit switch being mounted on a fixed part of the reduction gear unit,
    (d) and two members, arranged for actuation by the operating shaft of the window winding mechanism, for actuating the limit switches.

3. A mechanism according to claim 1 wherein the reduction gear unit comprises a worm gear in driving engagement with a worm wheel.

4. A mechanism according to claim 1 wherein the reduction gear unit further comprises,
    (a) a casing;
    (b) a hub portion rotatable in the casing and shaped for driving connection to the operating shaft of the window winding mechanism;
    (c) said gear unit comprising a worm wheel floatably mounted within the casing and rotatable with the hub portion, a worm in driving engagement with the worm wheel, and a worm shaft carrying the worm, rotatable within the casing and shaped for driving connection to one end of the flexible driving cable.

5. A mechanism according to claim 4 wherein the casing is formed from two pressed metal sheets secured together and having inwardly extending projections for limiting, in its axial direction, the floating movement of the worm wheel.

6. A mechanism according to claim 2 wherein,
    (a) each limit switch further comprises a fixed contact and a movable contact; and the means for actuating the limit switches further comprise,
    (b) a rotatable cam device for attachment to the operating shaft; and
    (c) two cam followers, each of which has a part cooperating with the movable contact of one of the limit switches and is moved by the cam device, during a predetermined extent of rotation thereof in one direction, to a position where it moves the movable contact of its associated limit switch away from the fixed contact.

7. A mechanism according to claim 6 wherein,
    (a) the cam device further comprises a spiral track, and
    (b) each cam follower further comprises a lever pivoted to a fixed part of the gear unit, one end of the lever engaging the spiral track and the other end of the lever cooperating with the movable contact of one of the limit switches.

8. A vehicle window winding mechanism comprising,
    (a) an operating shaft, rotation of which opens and closes a vehicle window;
    (b) an electric motor mounted on a part of the vehicle at a location away from the operating shaft;
    (c) a reduction gear unit having rotatable input and output members,
    (d) the output member being connected to the operating shaft;
    (e) a member connected between the gear unit and a part of the vehicle for preventing rotation of the gear unit as a whole about the operating shaft; and
    (f) a flexible driving cable arranged to transmit a drive from the electric motor to the input member of the gear unit.

References Cited

UNITED STATES PATENTS

| | | | |
|---|---|---|---|
| 2,706,915 | 4/1955 | Rosenberg | 318—267 X |
| 2,777,688 | 1/1957 | Ehrlich et al. | 49—349 X |
| 3,004,757 | 10/1961 | Lohr | 49—349 X |
| 3,069,152 | 12/1962 | Arlauskas et al. | 49—349 |

FOREIGN PATENTS 152,445   7/1953   Australia.

DAVID J. WILLIAMOWSKY, *Primary Examiner.*

J. K. BELL, *Assistant Examiner.*